United States Patent
Kato et al.

[11] Patent Number: 6,023,323
[45] Date of Patent: Feb. 8, 2000

[54] LASER BEAM TYPE DISTANCE MEASURING DEVICE

[75] Inventors: Masahiko Kato; Hiroshi Matsuzaki, both of Tokyo; Takahiko Iijima, Kawagoe, all of Japan

[73] Assignees: Nissan Motor Co., Ltd., Kanagawa; Olympus Optical Co., Ltd., Tokyo, both of Japan

[21] Appl. No.: 09/066,885

[22] Filed: Apr. 28, 1998

Related U.S. Application Data

[63] Continuation-in-part of application No. 08/546,069, Oct. 20, 1995, abandoned.

[30] Foreign Application Priority Data

Oct. 20, 1994 [JP] Japan .................................. 6-255471

[51] Int. Cl.$^7$ ................................. G01C 3/08; B60T 7/16
[52] U.S. Cl. ..................... 356/5.06; 180/169; 356/4.01
[58] Field of Search ..................... 356/4.01, 5.01–5.15; 180/169

[56] References Cited

U.S. PATENT DOCUMENTS

| | | |
|---|---|---|
| 4,511,249 | 4/1985 | Frungel et al. . |
| 4,521,107 | 6/1985 | Chaborski et al. . |
| 4,533,242 | 8/1985 | McLauchlan et al. . |
| 5,006,721 | 4/1991 | Cameron et al. ..................... 250/561 |
| 5,377,219 | 12/1994 | Geiger . |

FOREIGN PATENT DOCUMENTS 8-122426   4/1996   Japan .

Primary Examiner—Stephen C. Buczinski
Attorney, Agent, or Firm—Foley & Lardner

[57] ABSTRACT

A laser beam type distance measuring device comprising a laser beam emitter; a laser beam receiver having a going laser beam sensor and a returning laser beam sensor; an electrical signal processing circuit connected to the going and returning laser beam sensors; a returning laser beam guide way leading to the returning laser beam sensor; a polygon mirror for reflecting a going laser beam from the laser beam emitter toward a remote object and reflecting a returning laser beam from the object toward the returning laser beam guide way along which the returning laser beam travels to the returning laser beam sensor; and a reference optical track having one end directed to the laser beam emitter and the other end directed to the going laser beam sensor, so that a first part of the going laser beam from the laser beam emitter travels to the going laser beam sensor through the reference optical track. In the present invention, there is further provided a laser transmitting member, such as an optical fiber, which is arranged in parallel with path to and from the object. The laser transmitting member has one end directed to the laser beam emitter and the other end directed to the returning laser beam sensor, so that a second part of the going laser beam from the laser beam emitter travels to the returning laser beam sensor through the laser transmitting member.

8 Claims, 4 Drawing Sheets

LASER BEAM TYPE DISTANCE MEASURING DEVICE

CROSS-REFERENCES TO RELATED APPLICATIONS

This application is a continuation-in-part of U.S. application Ser. No. 08/546,069, filed Oct. 20, 1995, now abandoned.

BACKGROUND OF THE INVENTION

1. Field of the Invention

The present invention relates in general to devices for measuring a distance and more particularly to distance measuring devices of a laser beam using type which, for measuring the distance to an object, emits a going laser beam toward the object and detects a returning laser beam from the object. (The returning laser beam is the going laser beam which has been reflected by the object.) In practical use, the period required for the laser beam to make the round trip is detected. The distance to the object is equal to the one-half of the time elapsed multiplied by the velocity of the laser beam.

2. Description of Related Art

FIG. 4 shows schematically an electric circuit installed in a conventional distance measuring device of a laser beam using type. Designated by numeral 101 is a laser output circuit 101 which has a laser emitting section 102 connected thereto. Upon energizing the laser output circuit 101, a going laser beam "LT" is emitted from the laser emitting section 102 toward a remote object (not shown) and at the same time a part "L1" of the going laser beam "LT" is sensed by a going laser beam sensor 103. In fact, between the laser emitting section 102 and the going laser beam sensor 103, there is arranged a reference optical track 108 through which the part "L1" of the going laser beam "LT" travels before being led into the going laser beam sensor 103. Thus, the part "L1" of the laser beam "LT" is referred to as a reference laser beam. A returning laser beam "LR" which has been reflected by the object is sensed by a returning laser beam sensor 104. Each laser beam sensor 103 or 104 converts the light energy of the sensed laser beam to corresponding electric wave signal "T1" or "R" (see FIGS. 5A and 5B). The two laser beam sensors 103 and 104 are connected to a wave processing circuit 107 through respective amplifying circuits 105 and 106.

As is seen from FIGS. 5A–5C, in the wave processing circuit 107, the wave signal "R" of the returning laser beam "LR" and the wave signal "T1" of the reference laser beam "L1" (viz., the wave signal of the going laser beam "LT") are processed to produce a series of pulse signal "PS" whose pulse width "t" corresponds to the phase difference between the returning laser beam "LR" and the reference laser beam "L1" (viz., the going laser beam "LT"). More specifically, the pulse width "t" represents the period required for the going laser beam to make the round trip.

As is seen from FIG. 4, the wave processing circuit 107 outputs a distance representing voltage signal "RD" which is based on the pulse width "t".

However, due to its inherent construction, the above-mentioned conventional distance measuring device tends to lower its performance particularly when used in a high temperature place. That is, when heated due to inevitable heat generation of the device in use and/or heat possessed by surrounding air, the distance representing voltage signal "RD" issued from the wave processing circuit 107 tends to have a no small error. This is because the signal treatment is influenced by the amplitude of the sensed laser beam and the fluctuation of the threshold of the comparator. In other words, the signal treatment is influenced by the temperature drift of the electric circuit elements of the sensor, amplifier, comparator, etc. As a result of this fact, the wave processing circuit 107 processes an electric wave signal "T2" (see FIG. 5B) which is advanced (or delayed) in phase with respect to the desired (or proper) electric wave signal "T1". Thus, in this case, the pulse signal "PS" has an erroneous pulse width "te" which is greater than the actual pulse width "t", and thus the distance representing voltage signal "RD" from the wave processing circuit 107 has no small error.

SUMMARY OF THE INVENTION

It is therefore an object of the present invention to provide a distance measuring device which is free of the above-mentioned drawback.

According to the present invention, there is provided a laser beam type distance measuring device having therein means for carrying out temperature compensation.

According to the present invention, there is provided a laser beam type distance measuring device which comprises a laser beam emitter; a laser beam receiver having a going laser beam sensor and a returning laser beam sensor; an electrical signal processing circuit connected to the going and returning laser beam sensors; a returning laser beam guide way leading to the returning laser beam sensor; a polygon mirror for reflecting a going laser beam from the laser beam emitter toward a remote object and reflecting a returning laser beam from the object toward the returning laser beam guide way along which the returning laser beam travels to the returning laser beam sensor; a reference optical track having one end directed to the laser beam emitter and the other end directed to the going laser beam sensor, so that a first part of the going laser beam from the laser beam emitter travels to the going laser beam sensor through the reference optical track; and a laser transmitting member arranged in parallel with the path to and from the object, the laser transmitting member having one end directed to the laser beam emitter and the other end directed to the returning laser beam sensor, so that a second part of the going laser beam from the laser beam emitter travels to the returning laser beam sensor through the laser transmitting member.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DETAILED DESCRIPTION OF THE PREFERRED EMBODIMENTS

Figure 1:
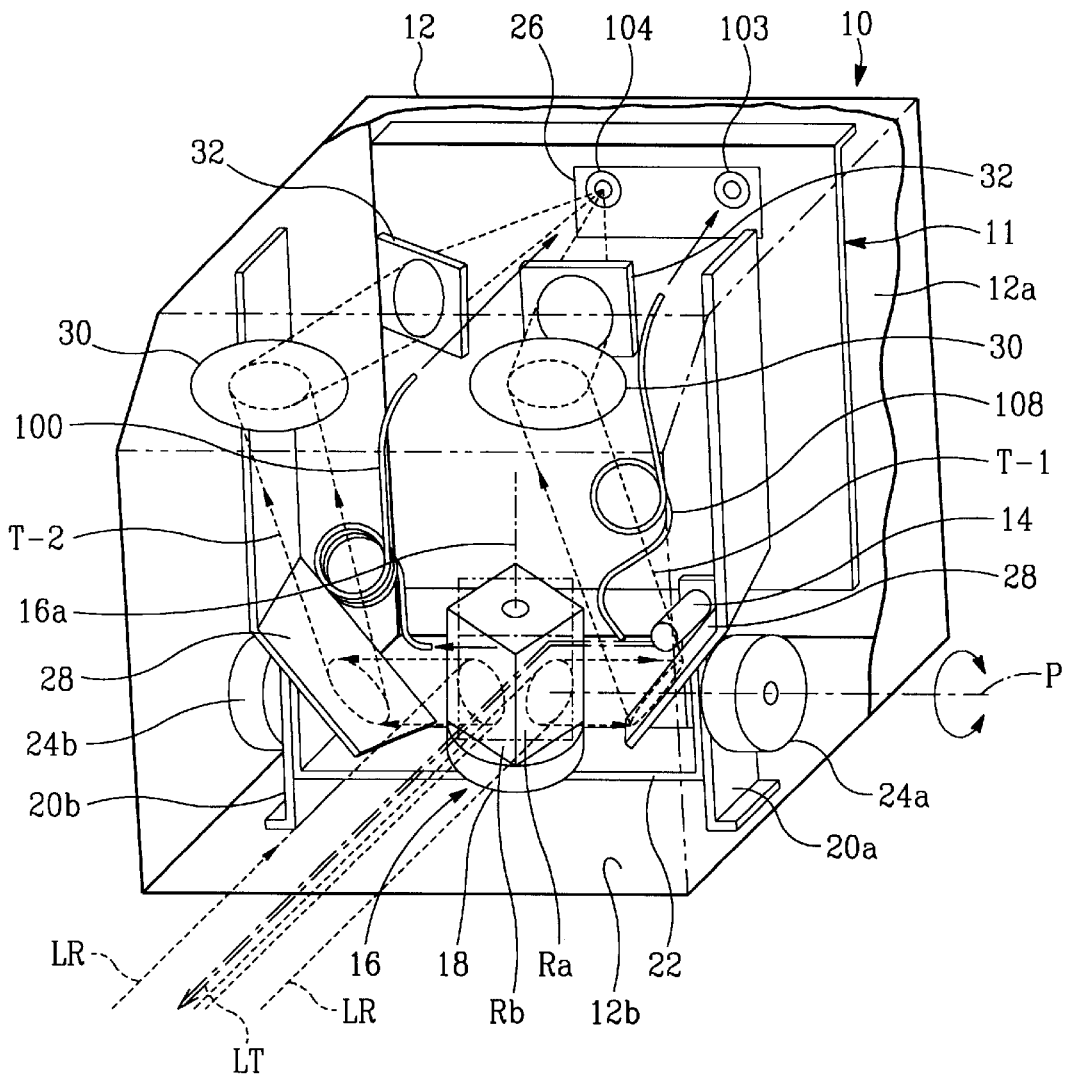
FIG. 1 is a perspective view of a laser beam type distance measuring device of the present invention.

Referring to FIG. 1 of the drawings, there is shown a laser beam type distance measuring device 10 according to the present invention.

The device 10 comprises generally a transmitter optical section, a scanning optical section, a receiver optical section and a control section 11, which are housed in a case 12. Designated by numerals 12a and 12b are rear and bottom walls of the case 12, respectively.

The transmitter optical section comprises a laser diode, a collimating lens, anamorphic prism pair and a beam expansion telescope which are arranged in a cylinder to constitute a laser beam emitter 14. A larger diameter laser beam is thus emitted from a laser emitting opening of the laser beam emitter 14 toward the scanning optical section.

Figure 2:
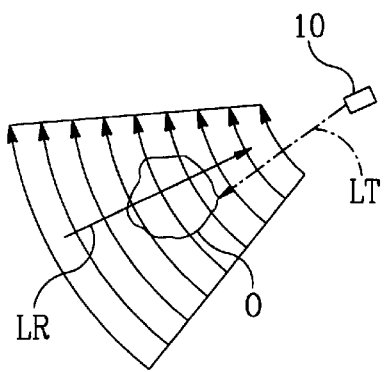
FIG. 2 is a view showing a scanning pattern of a laser beam projected toward an object from the device of the present invention.

The scanning optical section comprises a four-sided polygon mirror 16 which is mounted on and driven by an electric motor 18 to rotate at a given speed about its axis 16a. A nodding mechanism is incorporated with the motor 18 to swing the polygon mirror 16 upward and downward in the drawing. The nodding mechanism comprises a pair of stands 20a and 20b mounted on the bottom wall 12b of the case 12. A nodding plate 22 on which the motor 18 is mounted is pivotally connected at its raised both ends to the stands 20a and 20b. Designated by "P" is a pivot axis about which the nodding plate 22 pivots. The pivot axis "P" thus passes through the pivoted portions of the nodding plate 22. The pivot axis "P" is perpendicular to the rotation axis 16a of the polygon mirror 16 and preferably intersects the axis 16a at a center of the polygon mirror 16. A step motor 24a is mounted to the stand 20a to stepwisely pivot the nodding plate 22 at a given speed and given intervals. An angle sensor 24b is mounted to the other stand 20b for sensing the angle of the nodding plate 22 relative to the fixed bottom wall 12b of the case 12. When, due to continuous stepwise motion of the step motor 24a, the nodding plate 22 comes to its lowermost angular position, the angle sensor 24b issues a signal to operate the step motor 24a in a manner to jump up the nodding plate 22 to its uppermost angular position. The rotation of the polygon mirror 16 about the rotation axis 16a and the swinging movement of the nodding plate 22 about the pivot axis "P" are synchronized so that the transmitted laser beam "LT", which has been reflected by the polygon mirror 16, scans an object "O" (see FIG. 2) from left to right, top to bottom.

The receiver optical section comprises generally first and second parallel optical tracks "T-1" and "T-2" (or optical guide ways) through which the returning laser beams "LR", which have been reflected from the object "O", travel to be focused on a laser beam receiver 26.

The laser beam receiver 26 has the above-mentioned two laser beam sensors 103 and 104 installed therein.

As shown in FIG. 1, the first and second optical tracks "T-1" and "T-2" are arranged symmetrical with respect to an imaginary plane along which the rotation axis 16a of the polygon mirror 16 runs during the swinging movement of the nodding plate 22. Each track "T1" or "T-2" comprises one ("Ra" or "Rb") of the four mirror surfaces of the polygon mirror 16, a first inclined fixed mirror 28 arranged beside the polygon mirror 16, a second inclined fixed mirror 30 arranged above the first mirror 28 and a reduction telescope 32 arranged between the second mirror 30 and the laser beam receiver 26. The reduction telescope 32 is equipped with an interference filter.

The reference optical track 108 (made of glass fiber or the like) is also illustrated in FIG. 1. Theoretically, it is best to transmit the laser beam of the laser beam emitter 14 directly to the going laser beam sensor 103 through air. However, such direct transmission is not possible because the laser beam emitter 14 moves or swings together with the nodding plate 22. Thus, a flexible glass fiber is needed for constituting the reference optical track 108. In fact, the reference optical track 108 has a lower end which is connected to a raised portion (not shown) of the nodding plate 22 and directed to the laser beam emitter 14. With this, the lower end of the track 108 constantly faces the laser emitter opening of the emitter 14 irrespective of swinging of the nodding plate 22. An upper end of the reference optical track 108 (glass fiber) is connect to a projected portion (not shown) of the rear wall 12a and directed to the laser beam sensor 103.

The returning laser beam sensor 104 is arranged to receive the two returning laser beams "LR" and "LR" from the object "O", and the laser beam from an optical fiber 100.

The optical fiber 100 has a lower end which is connected to a raised portion (not shown) of the nodding plate 22 and directed to the laser emitting opening of the laser beam emitter 14. An upper end of the optical fiber 100 is connected to the projected portion (not shown) of the rear wall 12a and directed to the other laser beam sensor 104. The polygon mirror 16 is located on the nodding plate 22 at a position offset from a so-called beam transmitting path between the lower end of the optical fiber 100 and the laser beam emitter 14. Thus, when, under rotation of the polygon mirror 16, it comes to an illustrated first angular position, the beam transmitting path is blocked by angled edges of the polygon mirror 16. While, when the rotating polygon mirror 16 comes to a second angular position wherein one of the four flat surfaces thereof is in parallel with the beam transmitting path, the path is not blocked. In this very short condition, the laser beam from the laser beam emitter 14 can reach the lower end of he optical fiber 100 and thus to the sensor 104.

Figure 6:
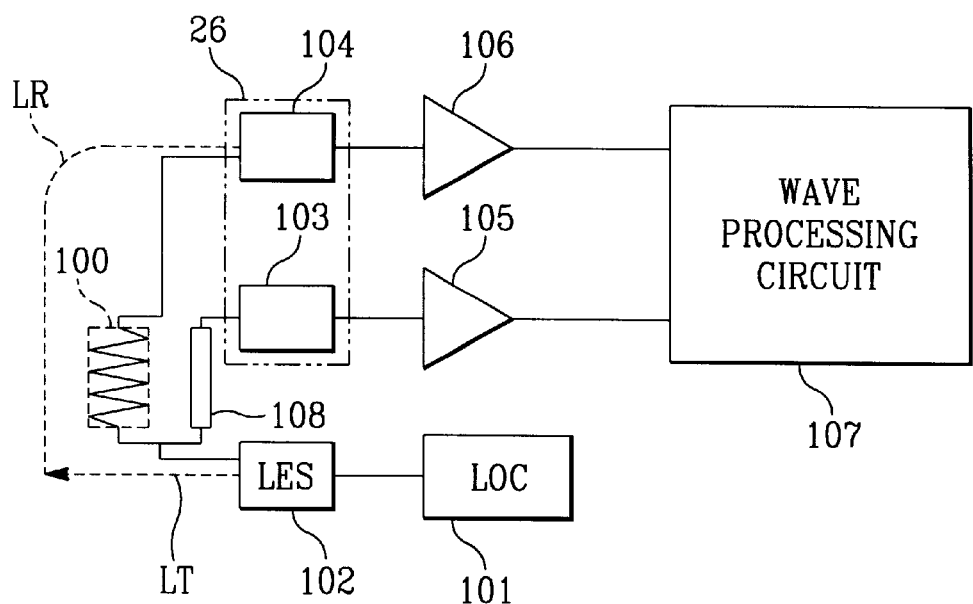
FIG. 6 is a block diagram similar to FIG. 4, but showing an electric circuit employed in the distance measuring device of the present invention.

In operation, the laser beam "LT" from the laser beam emitter 14 is reflected by the rotating polygon mirror 16 toward the object "O". Part of the going laser beam "LT" is reflected by the object "O" and thus produces two returning laser beams "LR" and "LR" directed toward the rotating polygon mirror 16. Each returning laser beam "LR" is reflected by the rotating polygon mirror 16, a first mirror 28 and a second mirror 30, condensed by the reduction telescope 32 (condensing lens) and then led into the returning laser beam sensor 104. With respect to a reference beam, i.e. a portion of the going beam "LT", just received at the going laser beam sensor 103 from the laser beam emitter 14, the combined beams "LR" just received by the sensor 104 have a time-lag corresponding to the time needed for the beam to make a round trip to the object "O". Thus, by measuring the phase difference corresponding the time-lag, the distance to the object "O" can be derived. The reference beam used in this measurement is the laser beam which (referring to FIG. 6) has been just led into the going laser beam sensor 103 from the laser emitting section "LES" 102 through the reference optical track 108.

As has been mentioned hereinabove, when, under rotation of the polygon mirror 16, the mirror 16 assumes the second angular position, the laser beam emitted from the laser beam emitter 14 is directly led into the lower end of the optical fiber 100 without hitting against the polygon mirror 16. That is, in this very short period, the laser beam from the emitter 14 is led into the sensor 104 through the optical fiber 100. In other words, in this very short period, in place of the returning beam "LR", the sensor 104 receives the laser beam which has a phase-lag corresponding to the length of the optical fiber 100.

Temperature compensation is also determined with regard to the reference signal output by the going laser beam sensor 103. With regard to this reference signal, a signal corresponding to the predetermined length of the optical fiber 100 is output by the returning laser beam sensor 104. Preferably, a quartz fiber having a predetermined length (e.g. several meters) is commonly used for the optical fiber 100. Due to nature of quartz, the predetermined length of the quartz fiber 100 does not substantially change when the surrounding temperature changes. In fact, there is no appreciable change in the length of a quartz fiber even when the temperature changes of 100° C.

Figure 5:
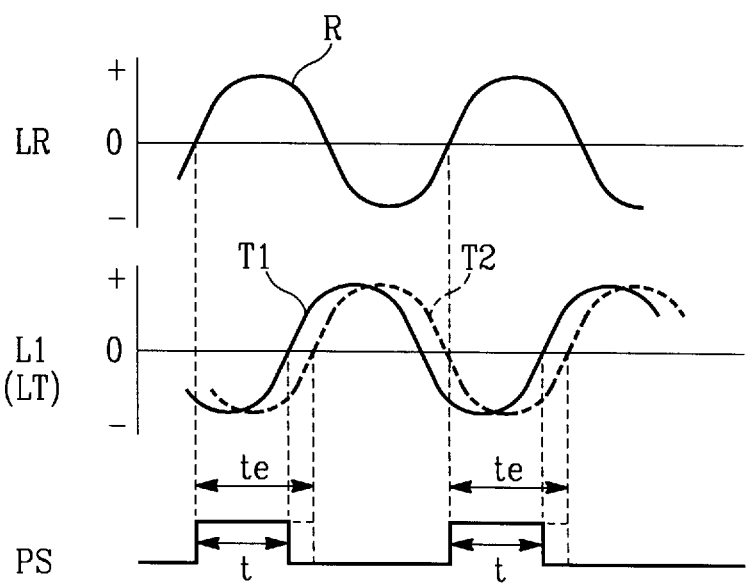
FIGS. 5A–5C show an electric wave signal of a just emitted laser beam, an electric wave signal of a return laser beam, and a pulse signal obtained by comparing the two wave signals.

Under operation of the distance measuring device 10, the returning laser beam sensor 104 and the going laser beam sensor 103 output electric wave signals which are similar to the wave signals "R" and "T2" of FIGS. 5A and 5B. However, in the present invention, due to provision of the optical fiber 100, a correction to compensate for temperature changes can be made to the advanced (or delayed) wave signal "T2" for obtaining the desired (or proper) electric wave signal "T1".

That is, when the reference optical track 108 and the optical fiber 100 receive the reference laser beam "L1" at the same time, the going laser beam sensor 103 outputs a first electric wave signal corresponding to the laser beam which has passed through the reference optical track 108, and the returning laser beam sensor 104 outputs a second signal corresponding to the laser beam which has passed through the optical fiber 100. Because of the predetermined length of the optical fiber 100, the second signal is delayed in phase with respect to the first signal. Base on the phase difference between the first and second signals, the length of the optical fiber 100 is calculated.

If the calculated length of the optical fiber 100 differs from its real length by "ΔL", it is judged that the signal treatment has been influenced by temperature drift of the electric circuit elements of the sensor, amplifier, comparator, etc. However, this undesirable influence is applied to both the returning laser beam "LR" from the object "O" and the laser beam from the optical fiber 100. Thus, by measuring and using the fluctuation (caused by temperature drift) of the measured value of the optical fiber 100, the measured value of the returning laser beam "LR" can be corrected. With this, the wave processing circuit 107 can output a series of pulse signal "PS" whose pulse width "t" accurately represents the period required for the going laser beam "LT" to make the round trip, hence an accurate measurement of the distance to the object can be made.

Figure 3:
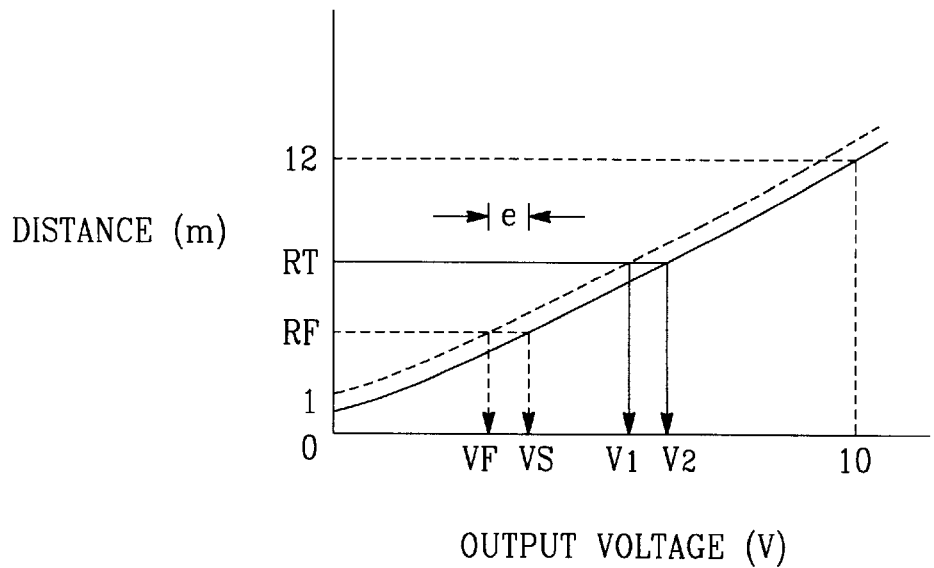
FIG. 3 is a graph depicting a relationship between a distance to an object and a voltage signal issued from a wave processing circuit, showing a temperature compensation carried out in the present invention.
Figure 4:
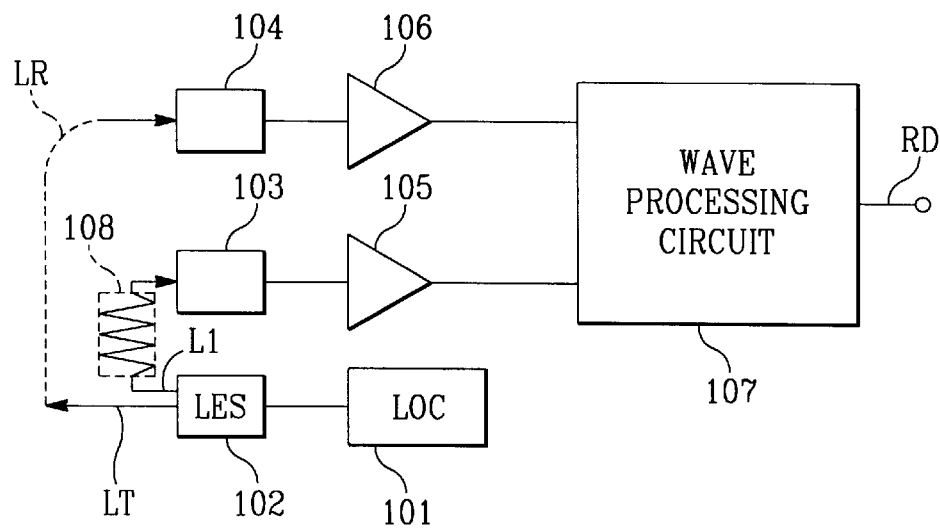
FIG. 4 is a block diagram of an electric circuit employed in a conventional laser beam type distance measuring device.

The above-mentioned temperature compensation technique may be easily apparent from the graph of FIG. 3, which depicts a relationship between a distance (meters) to an object "O" and a magnitude (voltage) of the voltage signal "RD" issued from the wave processing circuit 107. A solid curve is a reference curve previously provided based on the electric wave signals "R" and "T1" under a reference non-heated condition. That is, under the reference non-heated condition, the output "VS" represents the real length "RF" of the optical fiber 100. If, under a heated condition, the output shows "VF" for representing the length of the optical fiber 100, it is judged that a certain error "e" is contained in the output owing to an increased temperature. Thus, as is illustrated with a broken line in the graph, a temperature compensated curve can be provided in accordance with the error "e". Thus, by using the two curves, the magnitude of a signal "V1" produced from the returning laser beam "LR" can be corrected to "V2" (by simple addition of the error "e"), so as to accurately represent the real distance "RT" to the object "O".

As is described hereinabove, in the distance measuring device of the present invention, an optical fiber 100 is arranged in parallel with the path to and from the object for correcting an erroneous signal which would be produced when the device is used under a heated condition.

Additional advantages and modifications will readily occur to those skilled in the art. Therefore, the invention in its broader aspects is not limited to the specific details, and representative devices, shown and described herein. Accordingly, various modifications may be made without departing from the spirit and scope of the general inventive concept as defined by the appended claims and their equivalents.

What is claimed is:

1. An optical device for measuring the distance to a remote object, the device comprising:

a light source;

a light receiver having a going light sensor and a returning light sensor;

an electrical signal processing unit connected to said going and returning light sensors;

a returning light guide way leading to said returning light sensor;

an optical member for reflecting going light from said light source toward the remote object and for reflecting returning light from the remote object toward said returning light guide way along which said returning light travels to the returning light sensor;

a reference optical track having one end directed to said light source and the other end directed to said going light sensor, so that a first part of the going light from said light source travels to said going light sensor through said reference optical track; and a light transmitting member having predetermined length and having a first end directed to said light source and a second end directed to said returning light sensor, so that a second part of the going light from said light source travels to said returning light sensor through said light transmitting member, wherein said electric signal processing unit computes a calculated length of said light transmitting member based on said first and second parts of the going light, and compares said calculated and predetermined lengths for effecting a temperature compensation of the measured distance to the object.

2. The optical device as claimed in claim 1, in which said light transmitting member is an optical fiber.

3. The optical device as claimed in claim 1, in which said electric signal processing unit detects a phase difference between said first part of the going light which has passed through said reference optical track and said second part of the going light which has passed through said light transmitting member.

4. The optical device as claimed in claim 3, in which said electric signal processing unit corrects the phase of said first part of the going light with reference to the detected phase difference.

5. The optical device as claimed in claim 1, in which said returning light guide way comprises two identical optical tracks.

6. The optical device as claimed in claim 2, in which said optical fiber has a coiled middle portion.

7. The optical device as claimed in claim 1, wherein said optical member is a polygon mirror, and said optical device further comprising:

a motor for rotating said polygon mirror about a first axis; and a motor for rotating said polygon mirror about a second axis which is perpendicular to said first axis.

8. A device for optically measuring a distance to a remote object based on a phase difference between a going light emitted from a light source toward the object and a returning light reflected by the object, comprising:

a light transmitting member having a predetermined optical length as a reference, said light transmitting member exhibiting substantially no change in length even when temperature changes; and a temperature compensating means for measuring the length of said light transmitting member based on a phase difference between the going light emitted from the light source and the going light traveling through said light transmitting member, and for compensating a measured distance to the object by means of an error between a value corresponding to said reference and a value corresponding to said measured optical length of said light transmitting member.

* * * * *